Jan. 2, 1923. Re. 15,518

F. A. SCHWARTZ.
MOLD FOR PNEUMATIC TIRE TUBES.
ORIGINAL FILED AUG. 23, 1921.

Inventor
Fred A. Schwartz

By Ord & Gillman Attorneys

Reissued Jan. 2, 1923. Re. 15,518

UNITED STATES PATENT OFFICE.

FRED A. SCHWARTZ, OF COSHOCTON, OHIO.

MOLD FOR PNEUMATIC-TIRE TUBES.

Original No. 1,388,382, dated August 23, 1921, Serial No. 443,917, filed February 10, 1921. Application for reissue filed July 17, 1922. Serial No. 575,641.

*To all whom it may concern:*

Be it known that I, FRED A. SCHWARTZ, a citizen of the United States, residing at Coshocton, in the county of Coshocton and State of Ohio, have invented certain new and useful Improvements in Molds for Pneumatic-Tire Tubes; and I hereby declare the following to be a full, clear, and exact description of the invention, such as will enable others skilled in the art to which it pertains to make and use the same.

The invention relates to the construction and vulcanization of casings that are used in combination with pneumatic tubes, the said combination being usually referred to as the pneumatic tire.

The object of the invention is to provide means to correct certain faulty conditions that obtain with ordinary methods of constructing and vulcanizing casings.

In the process of vulcanizing casings it has been demonstrated that better results are obtainable when the fabric structure of the casing is subjected to pressure that is applied in the direction of the radii of the casing simultaneously with pressure that impulses the companion casing forming mold parts.

To this end various means are being employed, as for example, the casing to be vulcanized is removed from the rigid core upon which it is constructed and there is substituted an elastic core by which means the casing is during the process of vulcanization subjected to an expanding pressure that is admitted to within the elastic core.

With my invention in use, similar results are obtained, and without the expense of renewing at frequent intervals the elastic cores, and with a considerable saving in time and labor consumed in bolting or clamping companion casing forming mold parts against the internal pressure.

As will be made plainly evident in this specification, by reason of the novel conformation of the surface area of the improved core, and grooves of the companion casing forming mold parts, the fabric or cord structure of the casing during the process of vulcanization, is, by the use of my invention subjected to stress that is applied to the fabric or cord structure in the direction of the plane of the side walls of the casing simultaneously to the compressing action of the casing forming mold parts.

In the accompanying drawings which form a part of this specification, Figure 1 is a cross section of the vulcanized casing in association with a cross section of the improved equipment; the core and companion casing forming mold parts which comprise the improved equipment being in their relative operating position as assumed during the final stage of the process of vulcanization of the casing.

The improved equipment may be employed in the construction and vulcanization of casings of the clencher, or straight side type, and the core forming a part of the improved equipment may be rigid, or collapsible, and while the equipment is more particularly intended for use in the construction and vulcanization of casings of the cord ply construction, by the use of my improved equipment casings of superior quality may be produced in the woven fabric ply construction.

The function of the improved equipment is positively reliable, and results from the novel method of building or mounting the casing upon the core, and by the conformation given the side walls of the casing during the process of vulcanization.

The method of building, or constructing the casing upon the improved core is substantially the same as when employing the ordinary equipment; that is the body of the casing consists of several layers, or plies of rubberized fabric or cord, and upon which structure the outer elements of the casing, as the tread, beads, and side walls of rubber compounds, are secured by vulcanization.

Figure 1:
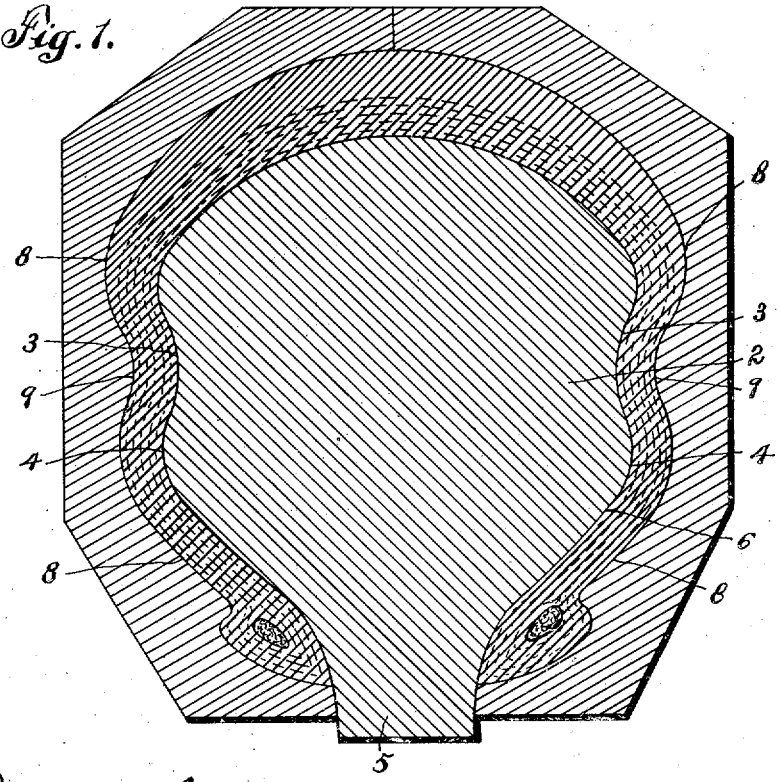

Referring to Fig. 1, and to the core 2, which may be constructed by any preferred method, as for example it may be cast solid, or hollow, or it may be constructed of pressed metal parts. It will be noted that the surface of the core is provided with circumferentially directed grooves, as indicated by the numerals 3, 3; it will also be noted that these grooves are positioned at substantially the central circumferential line between the inner and outer peripheries of the core, and that the conjunction of the concave and convex areas are affected by regular, but shorter curved areas, the importance of which will be later apparent.

When building the casing upon the improved core the surface area of the core between the inner edges 4, 4, of the grooves and the inwardly directed flange 5, is given a covering of rubber cement; the first ply 6, of fabric or cord is placed upon the core and "stitched," that is the ply is caused to conform to the surface area of the core, and the edges are secured to the core by the adhesive qualities of the rubber cement. As will be observed by referring to the numerals 7, 7, Fig. 3, the fabric or cord structure of the casing is not caused to conform to the surface area of the grooves; the result is that when the casing is finally completed by the casing builder, there is space between the surface area of the grooves 3, 3, and the inner surface of the unvulcanized casing.

The operation of the improved equipment when the casing is to be vulcanized is as follows: Referring to the casing forming mold parts, and to the annular casing forming grooves 8, 8, Fig. 1, it will be observed that the circumferentially directed ribs 9, 9, that are off-set from the inner or mold sides of the annular casing forming grooves 8, 8, aline with, and with the casing forming mold parts in closed position engage the grooves 3, 3, which are circumferentially directed upon the surface of the core. (It is understood that proper clearance is provided for the casing between the ribs and grooves when the mold parts are in closed position.)

By the means just described, the side walls of the casing are during the process of vulcanization caused to conform to the surface area of the annular grooves in the core, and the annular ribs off-set from the curved surface area of the casing forming grooves. Thus the surplus fabric or cord stock, that results from the closing action of the mold parts compressing the several fabric plies is taken up by the surface area of the core that is provided by the grooves.

The vulcanized casing is removed from the casing forming mold parts and stripped from the core in the usual manner. The vulcanized, but not inflated casing is of the same conformation as the surface area of the casing forming grooves in the companion mold parts in which the casing has been vulcanized, but by reason of the pressure exerted upon the side walls of the casing by the inflated inner air tube, the casing when in service will assume the regular curved conformation as indicated by the broken lines 10, 10, Fig. 2.

It may be remarked that the forcing of the side walls of the casing to the regular curved surface conformation will effect a compressing pressure in the direction of the plane of the side walls of the casing, the result of which will effect a thickening of the rubber compound covering the fabric structure of the casing. Thus the flexing, and reflexing action of the casing when in use will be much better withstood by the rubber compound projecting into the fabric structure of the casing at this most vulnerable point.

Figure 3:
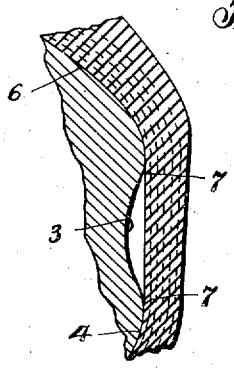
Fig. 3 is a view similar to Fig. 2, illustrating the method of building or mounting the unvulcanized casing upon the core.

When the raw tire or casing has been built over a noncompressible core 2, as shown in Fig. 3 of the drawings, and in which it will be noted that the core is of regular contour approximating the shape of the tire with the exception of a minor portion of the contour in which portions have been cut away or removed to form the circumferential grooves 3, it will also be apparent that upon the closing of the companion casing forming mold parts and the pressure applied thereto during the vulcanizing process, a section of each side of the tire or casing will be forced into the cavities formed by the channels 3, since the circumferentially directed ribs 9, aline with the annular casing forming grooves 3, and conform in contour to the contour of the latter. As the bead rings are securely held in place by the bottom contour of the mold it will be obvious that the distortion of the sides of the tire casing at points above such beads will produce a transverse stretching of all the layers of fabric or cord and a positive stretching of every section of each layer as will be obvious upon reference to Fig. 1 of the drawings.

Figure 2:
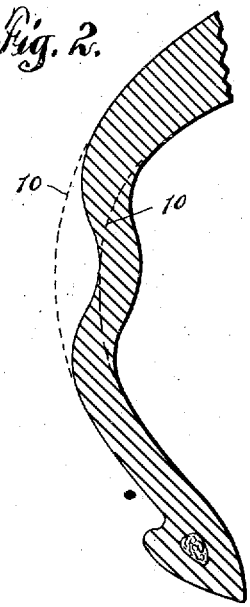
Fig. 2 is a fragmentary cross section of the vulcanized casing, illustrating by broken lines the conformation as assumed by the side walls of the casing when in use.

Upon reference to Fig. 2 of the drawings it will be noted from the dotted lines therein that the built up tire casing is substantially the same shape when completed and finished and vulcanized, as shown in Fig. 2, as when built up on the improved core before vulcanizing as shown in Fig. 3, with the exception that the finished casing may be somewhat larger due to the stretching action caused by temporarily distorting a portion of the tire at each side through the instrumentality of the circumferentially directed ribs 9, 9, registering with and cooperating with the grooves or channels 3 on the side surfaces of the core.

It will be seen also that I have provided stretching means in the coacting core and casing forming mold parts that will equally stretch every part of each layer of cord or fabric and that this equal transverse stretching of every part of the tire insures a uniform stretching of each layer and a proper proportioning of every part of the tire in accordance with the mold and core design thus positively eliminating all possibility of buckling, rim cutting or other similar tire irregularities. It will be seen further that in vulcanizing the tire by applying pressure directly by means of molds against a solid central core I have made it possible to cure and tension tires under a much greater pressure than by the use of air bags, or the like, and with the result that there is less separation of plies and a subsequent prolonging of the life of a tire.

Having thus described one of the embodiments of my invention, without having attempted to set forth all the forms in which it may be made, or all the modes of its use, what I claim and desire to secure by Letters Patent, is—

1. The method of forming tires, which consists in forming the tire casing about a core having side grooves, and pressing a portion of the tire into the said grooves.

2. The method of forming tires which consists in initially building up a tire of substantially the shape desired, and then distorting said tire circumferentially and vulcanizing.

3. A tire former comprising a tire core, having circumferential channels formed on its sides, and a mold having corresponding circumferential ribs designed to press portions of said tire into said channels.

4. A mold for pneumatic tires, comprising an annular core provided with annular grooves in its sides, and companion tire forming mold parts having annular ribs registering with said annular grooves in said core.

5. The method of forming tires which consists in building up a tire of substantially the size and contour desired, distorting circumferential portions of the tire and vulcanizing and curing in said distorted condition.

6. The method of forming tires which consists in forming the tire about the core having annular grooves in its sides and of approximately the contour of the finished tire, and then applying pressure to the exterior of the tire to distort the same into said grooves.

7. A core for forming tires, comprising a core having oppositely arranged circumferentially extending grooves, and a pair of complementary annular casing forming mold parts having interior annular ribs arranged in registration with said circumferentially extending grooves.

8. A casing mold comprising a pair of complementary annular sections each having an annular rib offset from its annular concave molding surface, and an annular core element having a molding surface normally extending between the said complementary annular sections, the said annular core element having grooves opposite said annular ribs.

9. The method of forming tires which consists in building up a tire about a core having its major portion of substantially the shape of the interior of the tire to be formed and having minor portions in its sides forming annular recesses, and distorting said tire through the medium of annular complementary mold sections having interior annular ribs arranged in registry with said annular recesses and adapted to press corresponding annular sections into said recesses.

In testimony whereof I have affixed my signature.

FRED A. SCHWARTZ.